(12) United States Patent
Almog (10) Patent No.: US 10,252,585 B1
(45) Date of Patent: Apr. 9, 2019

(54) SELF-INFLATION DEVICE FOR A TIRE

(71) Applicant: Eran Almog, Kibbutz Maagan Michael (IL)

(72) Inventor: Eran Almog, Kibbutz Maagan Michael (IL)

( * ) Notice: Subject to any disclaimer, the term of this patent is extended or adjusted under 35 U.S.C. 154(b) by 0 days.

(21) Appl. No.: 15/856,112

(22) Filed: Dec. 28, 2017

(51) Int. Cl.
*B60C 23/12* (2006.01)
*B60C 29/02* (2006.01)
*B60C 29/00* (2006.01)

(52) U.S. Cl.
CPC ............ *B60C 23/12* (2013.01); *B60C 29/002* (2013.01); *B60C 29/02* (2013.01)

(58) Field of Classification Search
CPC .............................. B60C 23/12; B60C 23/004
See application file for complete search history.

(56) References Cited

U.S. PATENT DOCUMENTS

| | | | | |
|---|---|---|---|---|
| 1,566,667 A * | 12/1925 | Fuller | ................... | B60C 23/12 152/418 |
| 4,349,064 A * | 9/1982 | Booth | ................... | B60C 23/12 152/418 |
| 5,355,924 A | 10/1994 | Olney | | |
| 5,865,917 A | 2/1999 | Loewe | | |
| 6,533,010 B1 * | 3/2003 | Alonso | ................. | B60C 23/004 152/415 |
| 7,117,910 B2 | 10/2006 | Akahori | | |
| 2008/0308206 A1 * | 12/2008 | Okada | ..................... | B60C 23/12 152/419 |

FOREIGN PATENT DOCUMENTS

| | | |
|---|---|---|
| JP | 2004-330820 | 11/2004 |
| JP | 2014-136547 | 7/2014 |
| JP | 2015-127196 | 7/2015 |

* cited by examiner

*Primary Examiner* — Jason R Bellinger (57) ABSTRACT

A self-inflation device for maintaining pressure in a tire, the self-inflation device includes a body having a piston compartment and an intake opening external to an inner space of the tire and a piston housed in the piston compartment and having a piston opening internal to the inner space. The piston is moved to a pulled position by centrifugal force applied by rotation of the tire to open the intake opening, and moved to a pushed position by air pressure from the inner space to block the intake opening and create a compression chamber within the piston compartment. The self-inflation device further includes a valve separating the compression chamber and the piston opening. The valve is opened when the piston is in the pushed position to allow airflow between the compression chamber and the inner space.

7 Claims, 10 Drawing Sheets

SELF-INFLATION DEVICE FOR A TIRE

FIELD AND BACKGROUND OF THE INVENTION

The present invention, in some embodiments thereof, relates to a self-inflation device for maintaining pressure in a tire and, more particularly, but not exclusively, to a device which inflates the tire using centrifugal force and tire air pressure.

Most types of wheel tires comprise compressed air. During use of the wheel, the air pressure in a tire gradually decreases. It is desirable to preserve the air pressure within a predetermined range, and ideally constant, to prevent excessive fuel consumption, tire wear and impaired steering ability which may compromise driving safety.

Apart from regular periodic inflation of the tire, using for example a compressor, some devices exist for maintaining air pressure in a tire. These devices may include high pressure air reservoir connected to the tire, electronic means for detecting low pressure and/or other components. Some devices include self-inflation mechanism which uses centrifugal force created by the turning of the wheel to extract surrounding air which is then pressed into the tire.

SUMMARY OF THE INVENTION

According to an aspect of some embodiments of the present invention there is provided a self-inflation device for maintaining pressure in a tire, comprising: a body having a piston compartment and an intake opening external to an inner space of the tire; a piston housed in the piston compartment and having a piston opening internal to the inner space, the piston is moved to a pulled position by centrifugal force applied by rotation of the tire to open the intake opening, and moved to a pushed position by air pressure from the inner space to block the intake opening and create a compression chamber within the piston compartment; and a valve separating the compression chamber and the piston opening, the valve is opened when the piston is in the pushed position to allow airflow between the compression chamber and the inner space.

Optionally, the self-inflation device further comprises a pin located in an opposing side of the piston compartment to the valve and pressing the valve when the piston is in the pushed position.

Optionally, the self-inflation device further comprises an adjustment mechanism for adjusting the size of the compression chamber.

More optionally, the adjustment mechanism is a screw.

Optionally, the self-inflation device further comprises a sealing component positioned around the piston and pressed into the piston compartment.

More optionally, the sealing component is a U-Cup seal.

Optionally, the piston opening is a channel passing along the piston.

Optionally, the valve is a standard pneumatic valve stem.

Optionally, the self-inflation device further comprises a tire valve portion having a one way inflation channel and an intake channel attached to the intake opening; wherein the tire valve portion is positioned at a tire valve opening of the tire.

More optionally, the one way inflation channel includes an inflation valve.

Optionally, the self-inflation device further comprises a mount adapted to fixate the body in relation to the tire.

Optionally, the self-inflation device is mounted on a rim holding the tire.

According to an aspect of some embodiments of the present invention there is provided a method of maintaining pressure in a tire by a self-inflation device, comprising: moving a piston to a pulled position by centrifugal force applied by rotation of the tire, the piston is housed in a piston compartment of a body and having a piston opening internal to an inner space of the tire; opening an intake opening of the body, the intake opening is external to the inner space so air flows into the piston compartment; moving the piston to a pushed position by air pressure from the inner space to block the intake opening and create a compression chamber within the piston compartment; and opening a valve separating the compression chamber and the piston opening to allow airflow between the compression chamber and the inner space.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a self-inflation device for maintaining pressure in a tire and, more particularly, but not exclusively, to a device which inflates the tire using centrifugal force and tire air pressure.

According to some embodiments of the present invention, there is provided a device which is attached to a wheel having a tire, and located at least partially inside the tire of the wheel and at least connected to the air outside the tire. The device includes a body, such as a tube, and a piston inserted within the body. When the wheel is turning, centrifugal force moves the piston along the body, which opens an intake opening of the body, allowing air to enter the body from outside. When the wheel slows its turning, pressure from inside the tire moves the piston towards the chamber, closing the intake opening and creating a compression chamber between the body and the piston. This is optionally done by a seal ring that is placed around the piston. This is possible since surface of the piston which is exposed to the inner space of the tire is larger than the surface exposed to the compression chamber. Unlike existing devices, the current device includes a springless mechanism, and the piston is pushed by pressure from inside the tire, so no spring or other flexible elements are required, which may wear during use.

The pressure from inside the tire further moves the piston to create air pressure within the compression chamber, until a valve separating the inner space of the tire and the compression chamber, for example a standard valve core attached to the piston, is opened. The valve may be opened by a pin located in an opposing side of the compression chamber. When the valve is opened, air may flow between the inner space of the tire and the compression chamber to equalize the pressures, for example via a channel passing along the piston. The device therefore preserves the pressure in the tire, by allowing bidirectional flow of air to correct the pressure when it is too high or too low. This is unlike existing devices, which may increase pressure but cannot lower the pressure when too high.

When the pressure in the compression chamber is higher than the pressure in the tire, air flows from the compression chamber to the tire, filling the tire with more air. This may happen when the pressure in the tire is insufficient. When the wheel turns again, the process is repeated, until the pressure in the tire is sufficient. When the pressures in the compression chamber and in the tire are equal, there is no airflow between them. When the pressure in the compression chamber is lower than the pressure in the tire, air flows from the tire to the compression chamber. The air then released outside when the wheel turns again. This may happen when there is too much pressure in the tire.

The size of the compression chamber and/or the opening of the valve may be adjusted, for example by a screw located in an opposing size of the body to the piston, and may include the pin which opens the valve. This adjusts the desired pressure in the tire, for example for different types of tires and/or vehicles.

Optionally, the device includes a tire valve portion having a one way inflation channel and may be positioned at a tire valve opening of the tire. This allows the device to be used without any needed modifications to the tire or rim.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figures 1A, 1B:
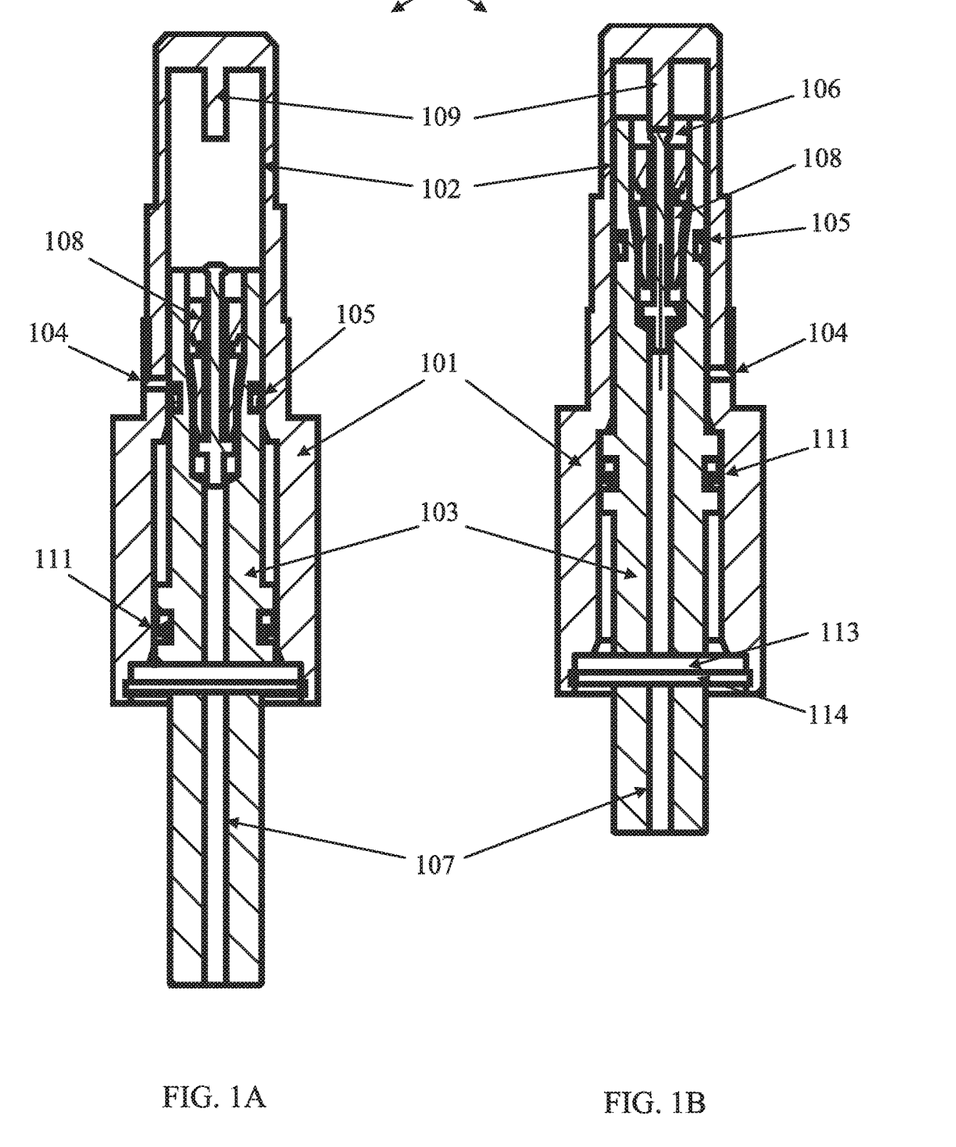
FIGS. 1A and 1B are cross section illustrations of a self-inflation device for maintaining pressure in a tire via centrifugal force and tire air pressure with a piston in a pulled position and in a pushed position, respectively, according to some embodiments of the present invention.

Referring now to the drawings, FIGS. 1A and 1B are cross section illustrations of a self-inflation device for maintaining pressure in a tire via centrifugal force and tire air pressure with a piston in a pulled position and in a pushed position, respectively, according to some embodiments of the present invention.

A self-inflation device 100 includes a body 101 having a piston compartment 102. Body 101 may have, for example, a cylindrical shape, or any other shape which may include piston compartment 102, which may be a tube fitting a piston. Body 101 and/or any other part of self-inflation device 100 may be made of any solid material, for example metal such as steel.

A piston 103 housed in piston compartment 102, is a cylinder fitting closely within the tube and is free to move up and down along piston compartment 102.

Body 101 is positioned perpendicular to the rotation axis of the wheel, so that piston 103 is movable inward in the direction of the center of the wheel and outward opposing the center of the wheel.

Body 101 is also positioned at least partially inside the inner space of the tire, so an outward side of the piston is exposed to the air inside the tire.

Figure 2:
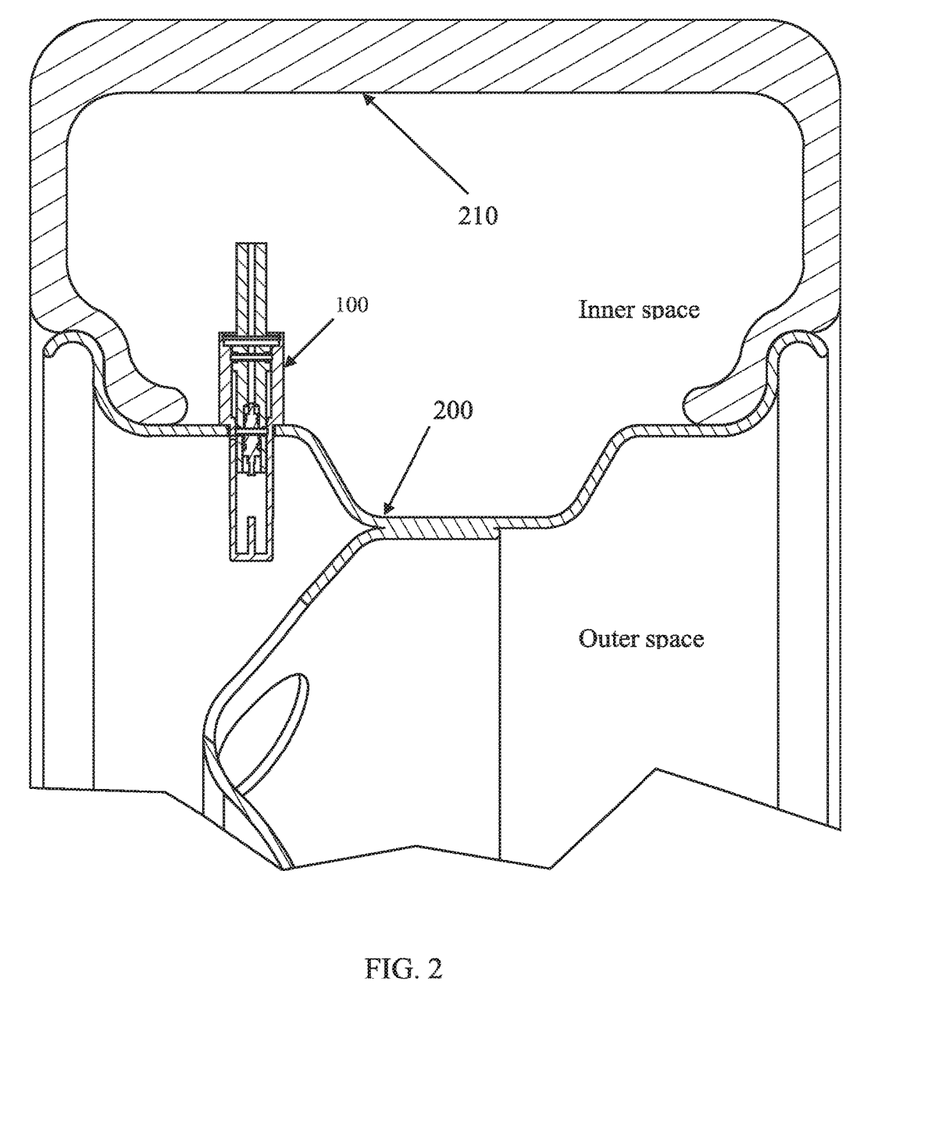
FIG. 2 is a cross section illustration of a self-inflation device, positioned on a rim of a wheel, according to some embodiments of the present invention.

Reference is now made to FIG. 2, which is a cross section illustration of a self-inflation device 100, positioned on a rim 200 of a wheel, according to some embodiments of the present invention. Rim 200 is optionally adapted to include self-inflation device 100, or may include a mount to fixate body 101. Body 101 may be positioned partially within an outer space of a tire 210, in a central part of the wheel.

Body 101 also includes an intake opening 104, which is external to an inner space of the tire, allowing air from outside the tire to flow into piston compartment 102. Intake opening 104 may be located in a part of body 101 which is external to an inner space of the tire, or may include an extension, for example a tube, which has one end external to an inner space of the tire. Optionally, a second intake opening is included in body 101, for example located in an opposing side of piston compartment 102 to intake opening 104. Optionally, a plurality of intake openings is included in body 101, for example arranged in a ring around the perimeter of piston compartment 102.

Figure 3:
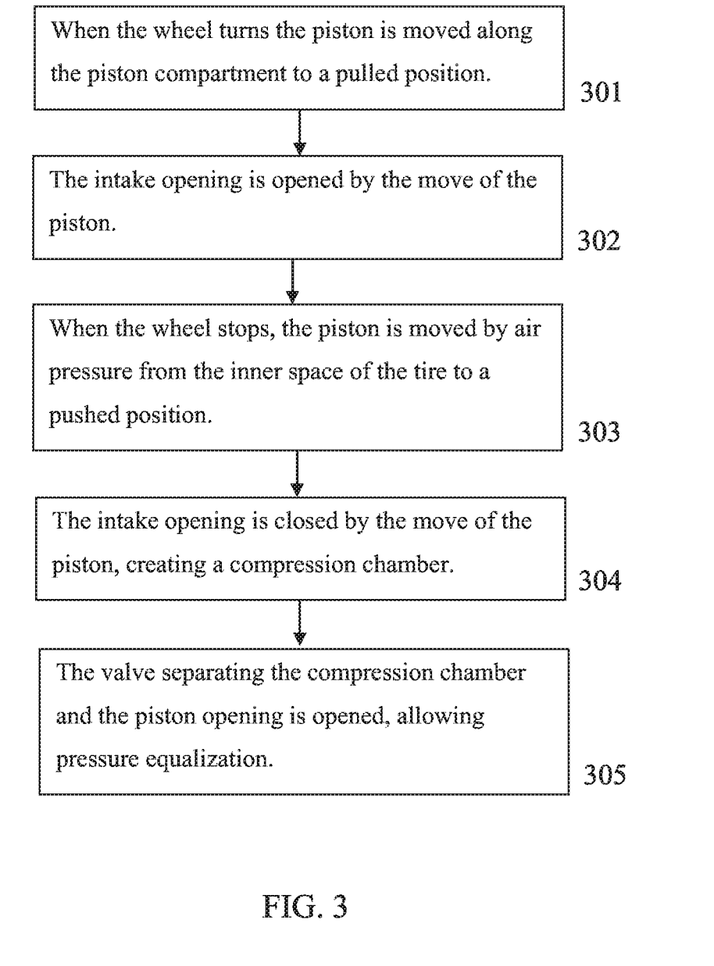
FIG. 3 is a flowchart schematically representing a method for maintaining pressure in a tire by a self-inflation device, according to some embodiments of the present invention.

Reference is now made to FIG. 3, which is a flowchart schematically representing a method for maintaining pressure in a tire by a self-inflation device, according to some embodiments of the present invention.

First, as shown at 301, when the wheel turns at a high speed, piston 103 is moved along piston compartment 102 to a pulled position, by centrifugal force applied by the rotation of the wheel. The speed needed for the centrifugal force to move piston 103 is determined by the design of self-inflation device 100, and specifically by the weight of piston 103 and pressure applied on piston 103 by the air inside the tire.

Then, as shown at 302, intake opening 104 is opened by the move of piston 103, which allows air from outside the tire to flow into piston compartment 102.

Optionally, piston 103 includes a sealing component 105 which is positioned around piston 103 and pressed into piston compartment 102. Sealing component 105 may be, for example, a rubber seal ring, a synthetic rubber seal ring such as an O-ring or any other seal ring or washer. Optionally, sealing component 105 is a U-Cup seal, such as used in the pneumatic and hydraulic industries because of low breakaway force and dynamic friction. When sealing component 105 moves beyond intake opening 104, intake opening 104 is opened.

Then, as shown at 303, when the wheel slows or stops turning, piston 103 is moved to a pushed position by air pressure from the inner space of the tire. In this state centrifugal force is no longer applied. The speed in which this happens is determined by the design of self-inflation device 100, as described above.

Then, as shown at 304, intake opening 104 is closed by the move of piston 103, which prevents air from escaping outside and creates a compression chamber 106 within piston compartment 102. The surface of piston 103 which is exposed to the inner space of the tire is larger than the surface exposed to the chamber, so a larger force is applied on piston 103 by the air inside the tire, moving piston 103 further to compression chamber 106 and increasing air pressure inside compression chamber 106.

Piston 103 includes a piston opening 107, which is internal to the inner space of the tire. Optionally, piston opening 107 is a channel passing along piston 103.

Then, as shown at 305, a valve 108 separating compression chamber 106 and piston opening 107 is opened, allowing airflow and pressure equalization between compression chamber 106 and the inner space of the tire. The air may flow from compression chamber 106 to the tire, from the tire to compression chamber 106 or none at all, depending on the pressures inside compression chamber 106 and the inner space of the tire, as described above.

Valve 108 may be located on the tip of piston 103, at the end of piston opening 107. Optionally, valve 108 is a standard pneumatic valve stem core commonly used on automobile and/or bicycle wheels, such as a Schrader valve. Valve 108 may also be any other pneumatic valve, for example including a poppet valve.

Optionally, valve 108 is pressed by a pin 109 located in an opposing side of compression chamber 106 to valve 108. Pin 109 may be a part of body 101, or may be included in separate component. When piston 103, with valve 108, moves toward pin 109, valve 108 is pressed onto pin 109 and opens, as shown at FIG. 1B.

Figures 4A, 4B:
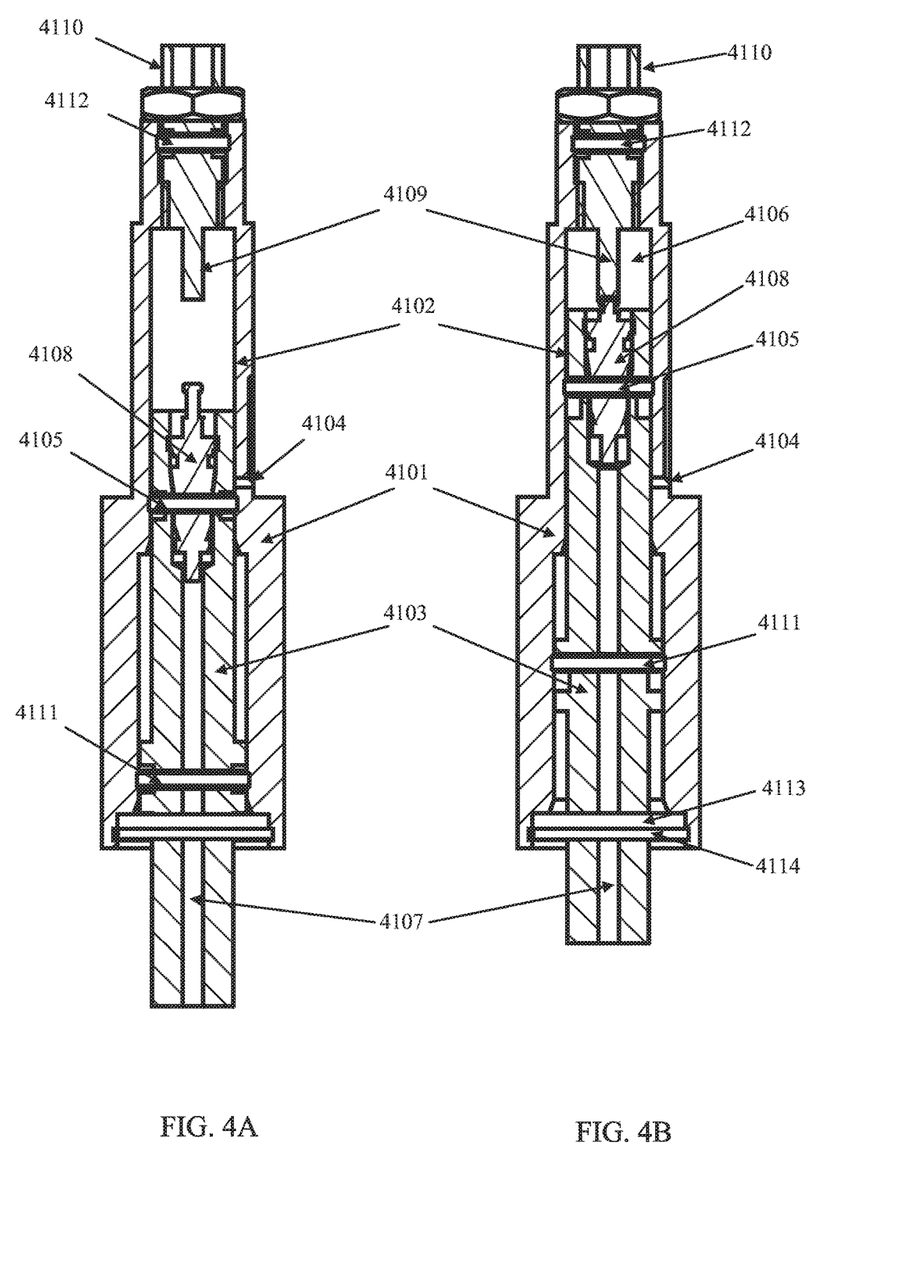
FIGS. 4A and 4B are cross section illustrations of a self-inflation device having an adjustment mechanism, with a piston in a pulled position and in a pushed position, respectively, according to some embodiments of the present invention.
Figures 5A, 5B:
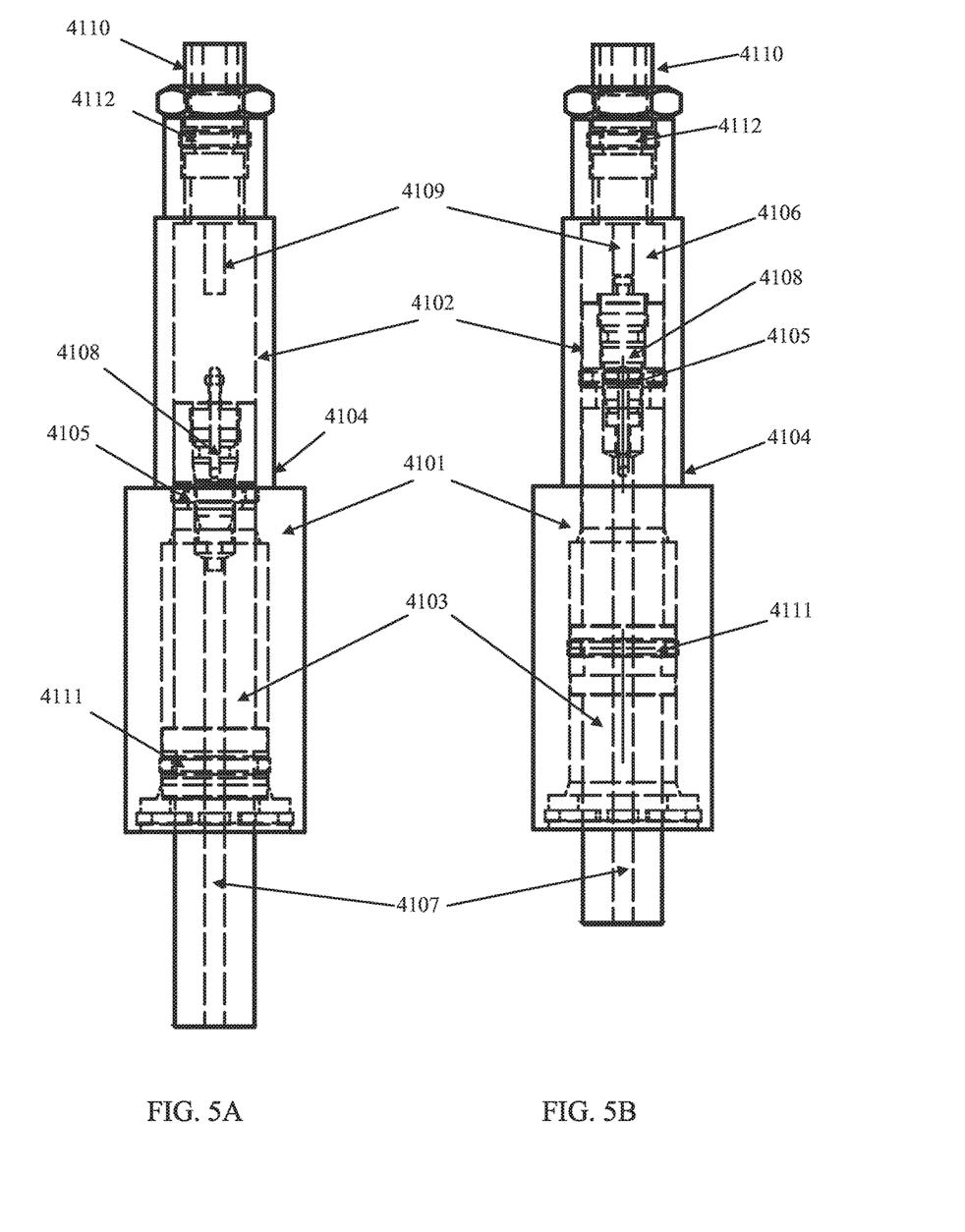
FIGS. 5A and 5B are further schematic illustrations of the self-inflation device of FIGS. 4A and 4B, respectively, according to some embodiments of the present invention.

Optionally, size of compression chamber 106 and/or the pressure in compression chamber 106 when valve 108 is opened, are adjusted by an adjustment mechanism. Reference is now made to FIGS. 4A and 4B, which are cross section illustrations of a self-inflation device having an adjustment mechanism, with a piston in a pulled position and in a pushed position, respectively, according to some embodiments of the present invention. Reference is also made to FIGS. 5A and 5B, which are further schematic illustrations of the self-inflation device of FIGS. 4A and 4B, respectively, according to some embodiments of the present invention. Optionally, the adjustment mechanism includes a screw 4110 that is attached to body 4101, and moves pin 4109 and/or a component holding pin 4109. Screw 4110 may be located on the end of body 4101 opposing piston 4103, sealing piston compartment 4102. When screw 4110 is adjusted, the size of compression chamber 4106 may be changed, so a different amount of air may be captured in compression chamber 4106. Also, when screw 4110 is adjusted, pin 4109 may be moved closer or further to valve 4108, so pin 4109 is pressed to valve 4108 at a different location, and therefore when the air in compression chamber 4106 is at a different pressure.

Optionally, the adjustment mechanism includes a switch which changes the pressure in compression chamber 4106 between two or more discreet pressures. This is advantageous when different pressures are required in the tire in different situations, for example with different load of the vehicle.

Optionally, self-inflation device 4100 includes other components for adjustment, for example a balancing weight attached to piston 4103 to increase centrifugal force.

Optionally, piston 4103 includes an additional sealing component 4111, to further prevent air from passing between piston 4103 and piston compartment 4102, as described above for sealing component 4105. Optionally, screw 4110, pin 4109 and/or a component holding pin 4109 includes a sealing component 4112. Self-inflation device 4100 may further include any other sealing components.

Optionally, piston 4103 is prevented from being pulled from piston compartment 4102 by the centrifugal force, for example by a shim ring 4113, optionally held by a spring retaining ring 4114.

Figure 6A:
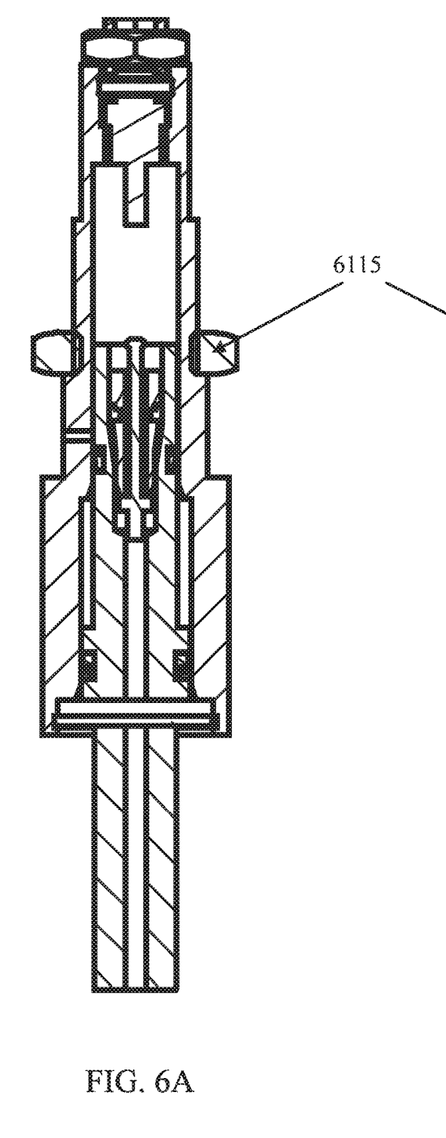
FIGS. 6A and 6B are cross section illustrations of a self-inflation device having a mount, with a piston in a pulled position and in a pushed position, respectively, according to some embodiments of the present invention.
Figure 6B:
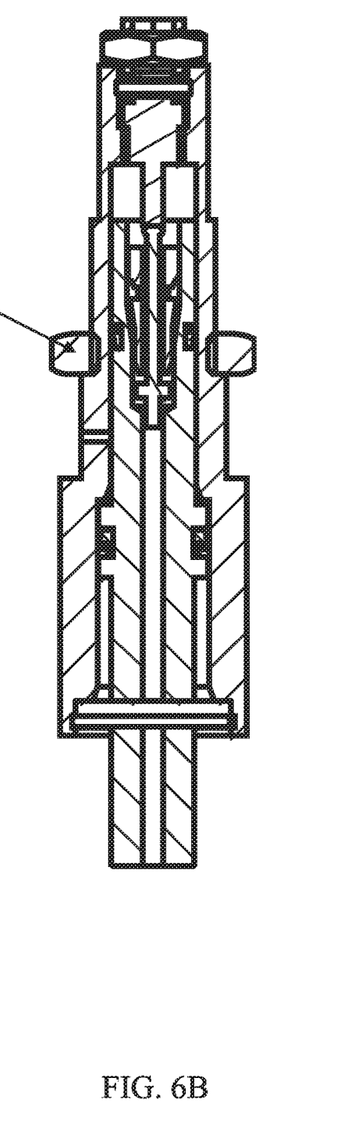
Figure 7:
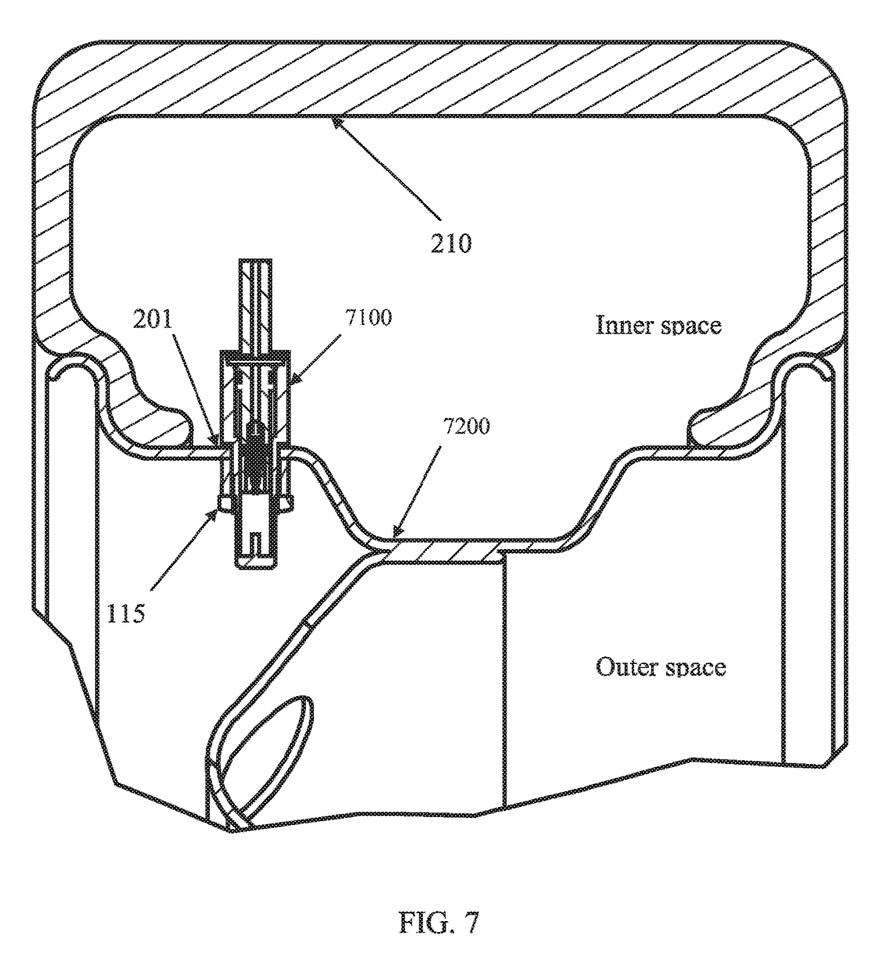
FIG. 7 is a cross section illustration of a self-inflation device, positioned on rim of a wheel by a mount, according to some embodiments of the present invention.

Optionally, a mount adapted to fixate body 4101 in relation to the tire is included. Reference is now made to FIGS. 6A and 6B, which are cross section illustrations of a self-inflation device having a mount 6115, with a piston in a pulled position and in a pushed position, respectively, according to some embodiments of the present invention. Reference is also made to FIG. 7, which is a cross section illustration of a self-inflation device, positioned on rim 7200 of a wheel by a mount, according to some embodiments of the present invention. Spacers and/or washers may be used to adjust the position of the device in the rim, for example as shown at 201 and 201.

Optionally, self-inflation device 7100 includes a tire valve portion 120, which includes a one way inflation channel and may be positioned at a tire valve opening of the tire.

Figure 8A:
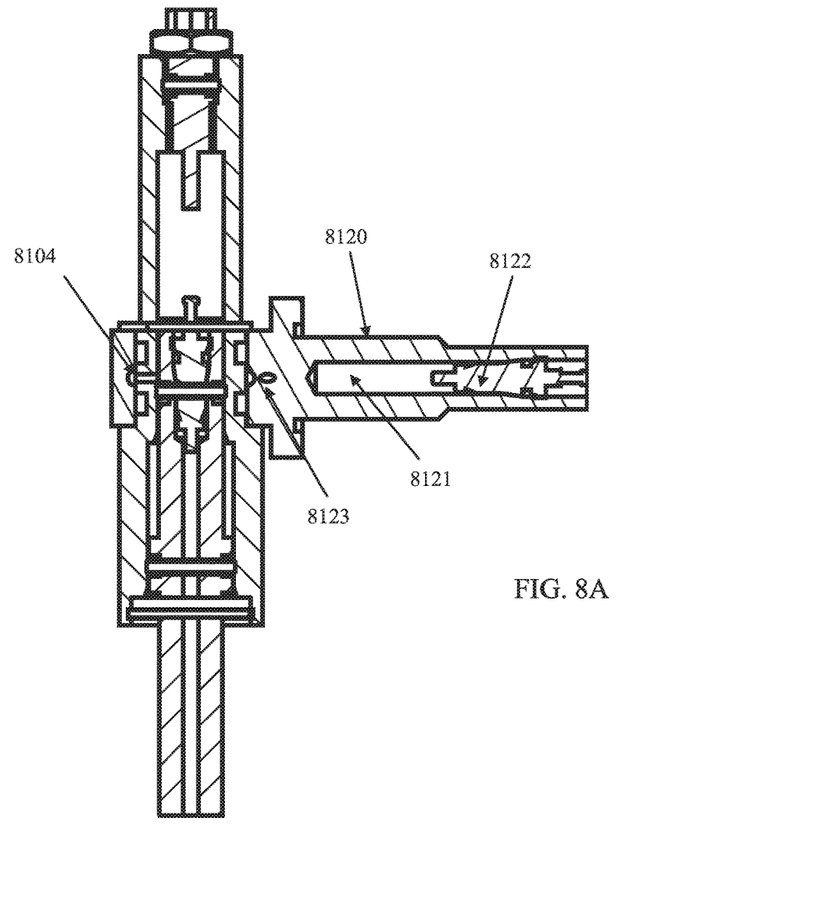
FIGS. 8A and 8B are different cross section illustrations of a self-inflation device having a tire valve portion, according to some embodiments of the present invention.
Figure 8B:
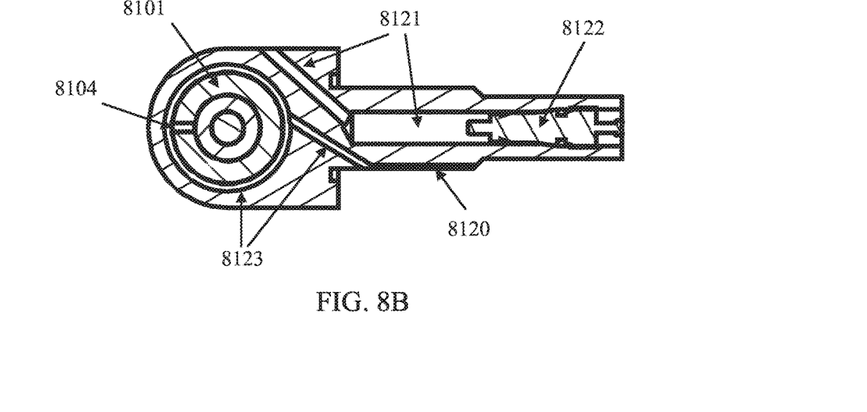

Reference is now made to FIGS. 8A and 8B, which are different cross section illustrations of a self-inflation device having a tire valve portion, according to some embodiments of the present invention.

Tire valve portion 8120 is connected to body 8101 and includes a one-way inflation channel 8121. One-way inflation channel 8121 may include an inflation valve 8122 which may be a standard pneumatic valve stem Tire valve portion 8120 also includes an intake channel 8123 attached to intake opening 8104.

Figure 9:
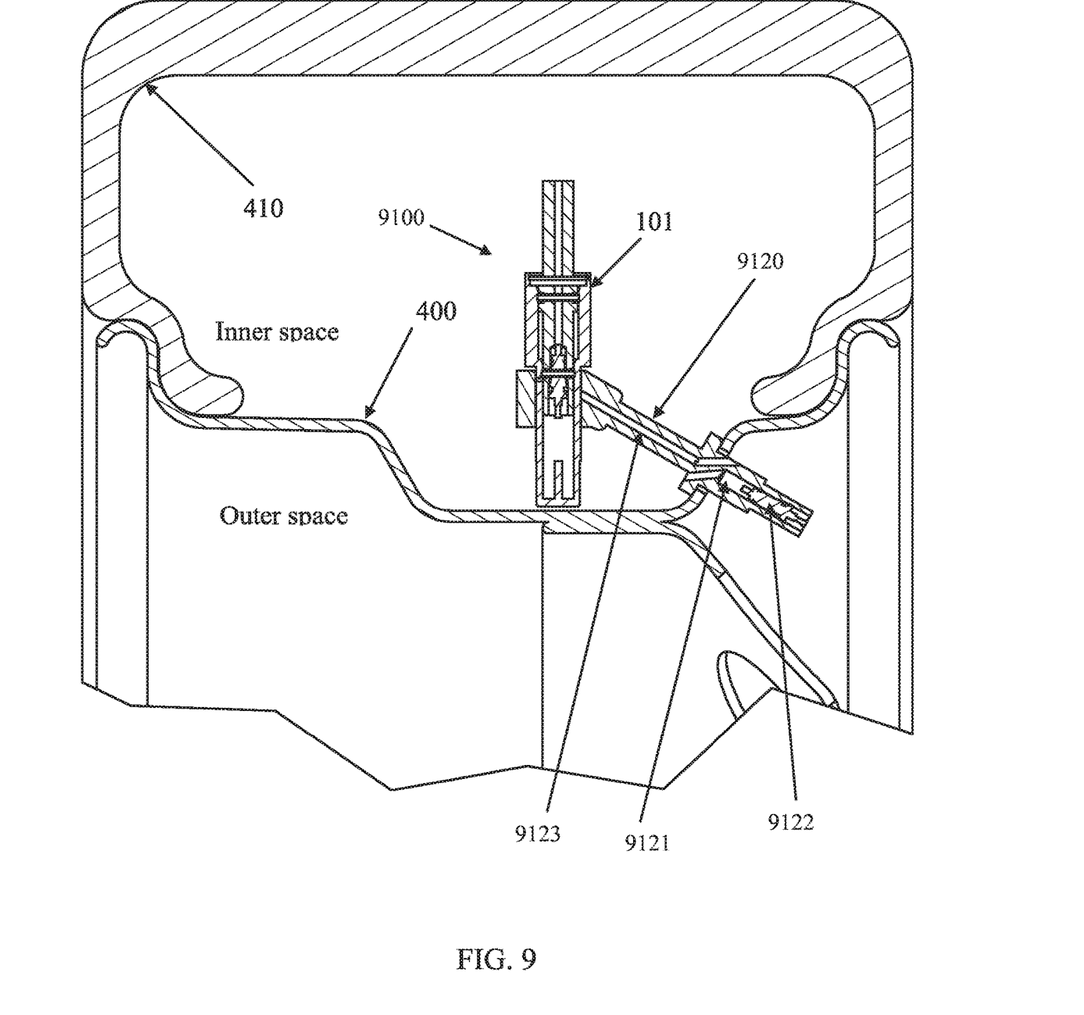
FIG. 9 is a cross section illustration of a self-inflation device having a tire valve portion positioned at a tire valve opening in a rim of a wheel, according to some embodiments of the present invention.
Figure 10:
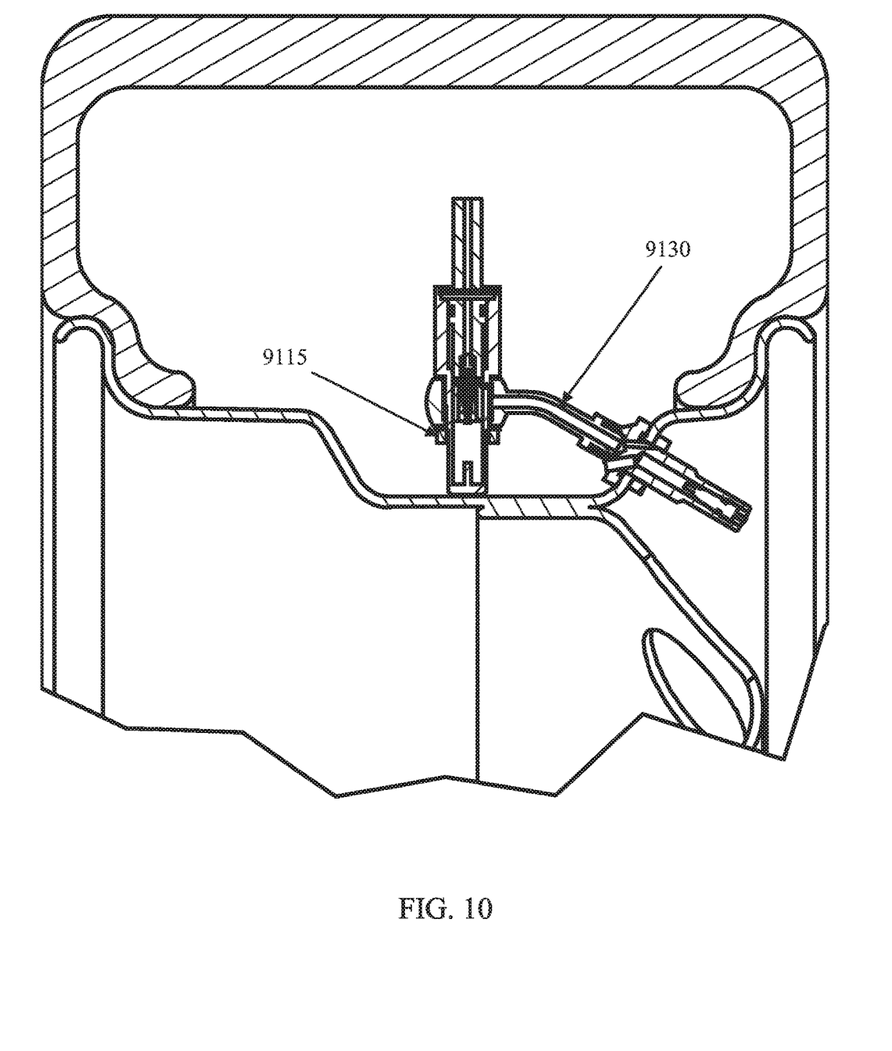
FIG. 10 is a cross section illustration of a self-inflation device having a tire valve portion held by a mount, positioned at a tire valve opening in a rim of a wheel, according to some embodiments of the present invention.

Reference is now made to FIG. 9, which is a cross section illustration of a self-inflation device having a tire valve portion positioned at a tire valve opening in a rim 400 of a wheel having holding a tire 410, according to some embodiments of the present invention. Reference is also made to FIG. 10, which is a cross section illustration of a self-inflation device having a tire valve portion 9130 held by mount 9115, positioned at a tire valve opening in a rim 400 of a wheel, according to some embodiments of the present invention.

Valve portion 9120 is positioned at least partially outside the inner space of the tire, so an outward side of inflation valve 9122 is exposed to the air outside the tire. Channel 9121 then connects between the inner space of the tire and the outside air, separated by valve 9122. Inflation valve 9122 may then be used as a regular tire valve.

Channel 9123 connects between intake opening and the air outside the tire, allowing air to flow inside piston compartment when piston is in pulled position.

Optionally, a plurality of self-inflation devices is used in one tire, to further increase inflation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant self-inflation devices will be developed and the scope of the term self-inflation device is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A self-inflation device for maintaining pressure in a tire, comprising:
    a body having a piston compartment and an intake opening external to an inner space of said tire;
    a piston housed in said piston compartment and having a piston opening internal to said inner space, said piston is moved to a pulled position by centrifugal force applied by rotation of said tire to open said intake opening, and moved to a pushed position by air pressure from said inner space to block said intake opening and create a compression chamber within said piston compartment;
    a valve separating said compression chamber and said piston opening, said valve is opened when said piston is in said pushed position to allow airflow between said compression chamber and said inner space; and
    a pin located in an opposing side of said piston compartment to said valve and pressing said valve when said piston is in said pushed position.

2. The self-inflation device of claim 1, further comprising: a sealing component positioned around said piston and pressed into said piston compartment.

3. The self-inflation device of claim 2, wherein said sealing component is a U-Cup seal.

4. The self-inflation device of claim 1, wherein said piston opening is a channel passing along said piston.

5. The self-inflation device of claim 1, further comprising:
a mount adapted to fixate said body in relation to said tire.

6. The self-inflation device of claim 1, mounted on a rim holding said tire.

7. A method of maintaining pressure in a tire by a self-inflation device, comprising:
- moving a piston to a pulled position by centrifugal force applied by rotation of said tire, said piston is housed in a piston compartment of a body and having a piston opening internal to an inner space of said tire;
- opening an intake opening of said body, said intake opening is external to said inner space so air flows into said piston compartment;
- moving said piston to a pushed position by air pressure from said inner space to block said intake opening and create a compression chamber within said piston compartment;
- opening a valve separating said compression chamber and said piston opening to allow airflow between said compression chamber and said inner space; and
- wherein a pin located in an opposing side of said piston compartment to said valve presses said valve when said piston is in said pushed position.

* * * * *